US009179309B2

(12) United States Patent
Rogers et al.

(10) Patent No.: US 9,179,309 B2
(45) Date of Patent: Nov. 3, 2015

(54) SECURITY MODE CONFIGURATION PROCEDURES IN WIRELESS DEVICES

(71) Applicant: NVIDIA Corporation, Santa Clara, CA (US)

(72) Inventors: Tim Rogers, Cambridge (GB); Olivier Jean, Sophia Antipolis (FR)

(73) Assignee: NVIDIA CORPORATION, Santa Clara, CA (US)

( * ) Notice: Subject to any disclaimer, the term of this patent is extended or adjusted under 35 U.S.C. 154(b) by 91 days.

(21) Appl. No.: 14/026,833

(22) Filed: Sep. 13, 2013

(65) Prior Publication Data

US 2015/0082444 A1 Mar. 19, 2015

(51) Int. Cl.
*H04W 12/08* (2009.01)
*H04W 36/00* (2009.01)

(52) U.S. Cl.
CPC .......... *H04W 12/08* (2013.01); *H04W 36/0038* (2013.01)

(58) Field of Classification Search
CPC ..... H04W 12/10; H04W 24/02; H04W 12/02; H04W 12/06; H04L 63/205; H04L 63/123; H04L 63/08; H04L 63/0263; H04L 63/0227; G06F 21/6218
USPC .......................................................... 726/26
See application file for complete search history.

(56) References Cited

U.S. PATENT DOCUMENTS

| 8,412,159 | B2* | 4/2013 | Martin et al. ................. 455/411 |
| 2011/0263222 | A1* | 10/2011 | Farnsworth et al. .......... 455/410 |
| 2011/0312299 | A1* | 12/2011 | Patil et al. ..................... 455/410 |
| 2012/0275340 | A1* | 11/2012 | McGann ....................... 370/254 |

OTHER PUBLICATIONS

"Digital Cellular Telecommunications System (Phase 2+); Universal Mobile Telecommunications System (UMTS); LTE; Mobile Radio Interface Layer 3 Specification; Core Networks Protocols; Stage 3," 3GPP TS 24.008 Version 11.7.0 Release 11, Jul. 2013, 678 pages.
3rd Generation Partnership Project; Technical Specification Group Radio Access Network; Radio Resource Control (RRC); Protocol Specification (Release 11); #GPP TS 25.331 V11.6.0, Jun. 2013, 2084 pages.

* cited by examiner

*Primary Examiner* — Ali Abyaneh
*Assistant Examiner* — Narciso Victoria

(57) ABSTRACT

A method of detecting an error in a security mode configuration procedure conducted at a radio access network is provided. A cell update message is transmitted which causes the radio access network to abort a security mode configuration procedure. After the transmission of an update message, a new security mode configuration is received and the original security mode configuration is replaced with a new security mode configuration. A security mode configuration check is performed on a received downlink message using the new security mode configuration. If the security mode configuration check fails, a further security mode configuration check is performed on the downlink message to detect an error in the security mode configuration procedure. If it is determined there has been an error in the security mode configuration procedure, security mode configuration checks are performed on further downlink messages received from the network using the original security mode configuration.

17 Claims, 10 Drawing Sheets

SECURITY MODE CONFIGURATION PROCEDURES IN WIRELESS DEVICES

BACKGROUND

In a communication system, a device (typically a mobile device) termed user equipment (UE) communicates wirelessly with a radio access network (such as the Universal Terrestrial Radio Access Network UTRAN). Communications between the UE and the radio access network are effected in accordance with a multi-layered communications protocol.

FIG. 1 shows a prior art Security Mode Command procedure between a UE 102 and radio access network 105 as described in the 3GPP 25.331 specification.

The security consists of two aspects, optional ciphering and mandatory integrity protection. Ciphering provides encryption according to a ciphering configuration to ensure that all signalling and data messages transmitted between the UE and the radio access network are ciphered over the air interface to provide data confidentiality. Integrity protection provides protection against message manipulation between the UE and the radio access network. That is, integrity protection prevents third parties from sending unauthorised signalling messages between the UE and radio access network. Typically, both ciphering and integrity protection are enabled during a call.

As part of the Security Mode Command procedure the radio access network sends a Security Mode Command 112 using the Radio Resource Control (RRC) protocol to the UE with an indication of a new integrity protection configuration and new cipher configuration to replace an original integrity and cipher configuration. In response to the Security Mode Command, the UE sends an acknowledgement message 114 to the radio access network and subsequently sends a RRC Security Mode Complete message 116 to the radio access network. In response to receiving the Security Mode Complete message from the UE, the radio access network sends an acknowledgement message RLC-ACK 118 to the UE.

The 3GPP 25.331 specification mandates a specific method to handle a cell update procedure during the security mode command procedure. This method is to abort the new integrity protection configuration and new cipher configuration, and continue with the original integrity protection configuration and cipher configuration (used prior to initiation of the security mode command procedure).

This is problematic because the Security Mode Command procedure terminates at different times in the UE and the radio access network, which can lead to the abortion of the Security Mode Command procedure in the UTRAN but not at the UE. In particular the UTRAN aborts the Security Mode Command procedure when the Cell Update message is received before the Security Mode Command Complete message from the UE. In contrast, the UE aborts the procedure when the Cell Update message is sent before it receives an acknowledgement 118 for the Security Mode Complete message from the radio access network.

When the UE performs a Cell Update whilst the UTRAN is waiting for the Security Mode Complete message from the UE, the UTRAN aborts the Security Mode Command procedure; however the UE does not abort the Security Mode Command procedure.

If the UE and radio access network do not abort the Security Mode Command procedure simultaneously, ciphering and integrity protection configuration will be not be the same in the UE and the radio access network which leads to the RRC connection to be lost. Loss of an RRC connection typically triggers a call drop, which is frustrating for the user of the UE.

Following the lost RRC connection the recovery can, depending on the radio conditions and network configuration, be a slow process. During the recovery procedure the user of a UE is disconnected from the network, unable to make or receive calls.

SUMMARY

According to a first aspect of the present disclosure, there is provided a method of detecting, at a wireless communication device, an error in a security mode configuration procedure conducted at a radio access network in wireless communication with the wireless communication device. The method comprises transmitting, from the wireless communication device, a cell update message to the radio access network, the cell update message transmitted to cause the radio access network to abort a security mode configuration procedure which is to replace an original security mode configuration with a new security mode configuration. The method further comprises receiving at the wireless communication device, after the transmission of the update message, the new security mode configuration and completing a security mode configuration procedure at the wireless communication device to replace the original security mode configuration with the new security mode configuration, and thereafter receiving at the wireless communication device a downlink message from the radio access network. A security mode configuration check is performed on the received downlink message using the new security mode configuration; and in the event that the security mode configuration check fails, a further security mode configuration check is performed on the downlink message to detect an error in the security mode configuration procedure. If the further security mode configuration check succeeds, it is determined there has been an error in the security mode configuration procedure and security mode configuration checks are performed on further downlink messages received from the network using the original security mode configuration.

According to another aspect of the present disclosure, there is provided a wireless communications device arranged to detect an error in a security mode configuration procedure conducted at a radio access network in wireless communication with the wireless communication device. The wireless communication device comprises: a transceiver arranged to transmit from the wireless communication device a cell update message to the radio access network, the cell update message transmitted to cause the radio access network to abort a security mode configuration procedure which is to replace an original security mode configuration with a new security mode configuration; a central processing unit; and a memory coupled to the central processing unit. The memory contains program code executable by the central processing unit to cause the central processing unit to perform the following steps: receive, after the transmission of said update message, the new security mode configuration and completing a security mode configuration procedure at the wireless communication device to replace the original security mode configuration with the new security mode configuration; and thereafter receive a downlink message from the radio access network. The program code further causes the central processing unit to perform a security mode configuration check on the received downlink message using the new security mode configuration, and in the event that the security mode configuration check fails, perform a further security mode configuration check on the downlink message using the original security mode configuration, and if the further security mode configuration check succeeds, perform security mode configuration checks on further downlink messages from the network using the original security mode configuration.

According to another aspect of the present disclosure there is provided a computer program product for detecting, at a wireless communication device, an error in a security mode configuration procedure conducted at a radio access network in wireless communication with the wireless communication device, the computer program product comprising code embodied on a non-transient computer-readable medium and configured so as when executed on a processing apparatus of the wireless communication device to perform the steps of any of the methods described herein.

According to another aspect of the present disclosure there is provided a method of performing, at a wireless communication device, an error recovery in the event of a breakdown of a security mode configuration procedure conducted at a radio access network in wireless communication with the wireless communication device in accordance with a multi-layered communication protocol. The method comprises receiving, at the wireless communication device, a downlink message from the wireless communication network effected by a signalling connection at a Radio Resource Control (RRC) layer of the multi-layered communication protocol between the wireless communication device and the wireless communication network and performing a security mode configuration check on the received downlink message. In the event that the security mode configuration check fails, it is determined that there has been a breakdown of a security mode configuration procedure to replace an original security mode configuration with a new security mode configuration. In response to that determination the signalling connection at the RRC layer to the wireless communication network is released at the wireless communication device without initiating a Radio Link Control (RLC) reset procedure, and the establishment of a new signalling connection at the RRC layer to the wireless communication network is begun.

BRIEF DESCRIPTION OF THE DRAWINGS

For a better understanding of the present embodiments and to show how the same may be put into effect, reference will now be made, by way of example, to the following drawings in which.

DETAILED DESCRIPTION

Embodiments of the present disclosure will now be described by way of example only.

Figure 2:
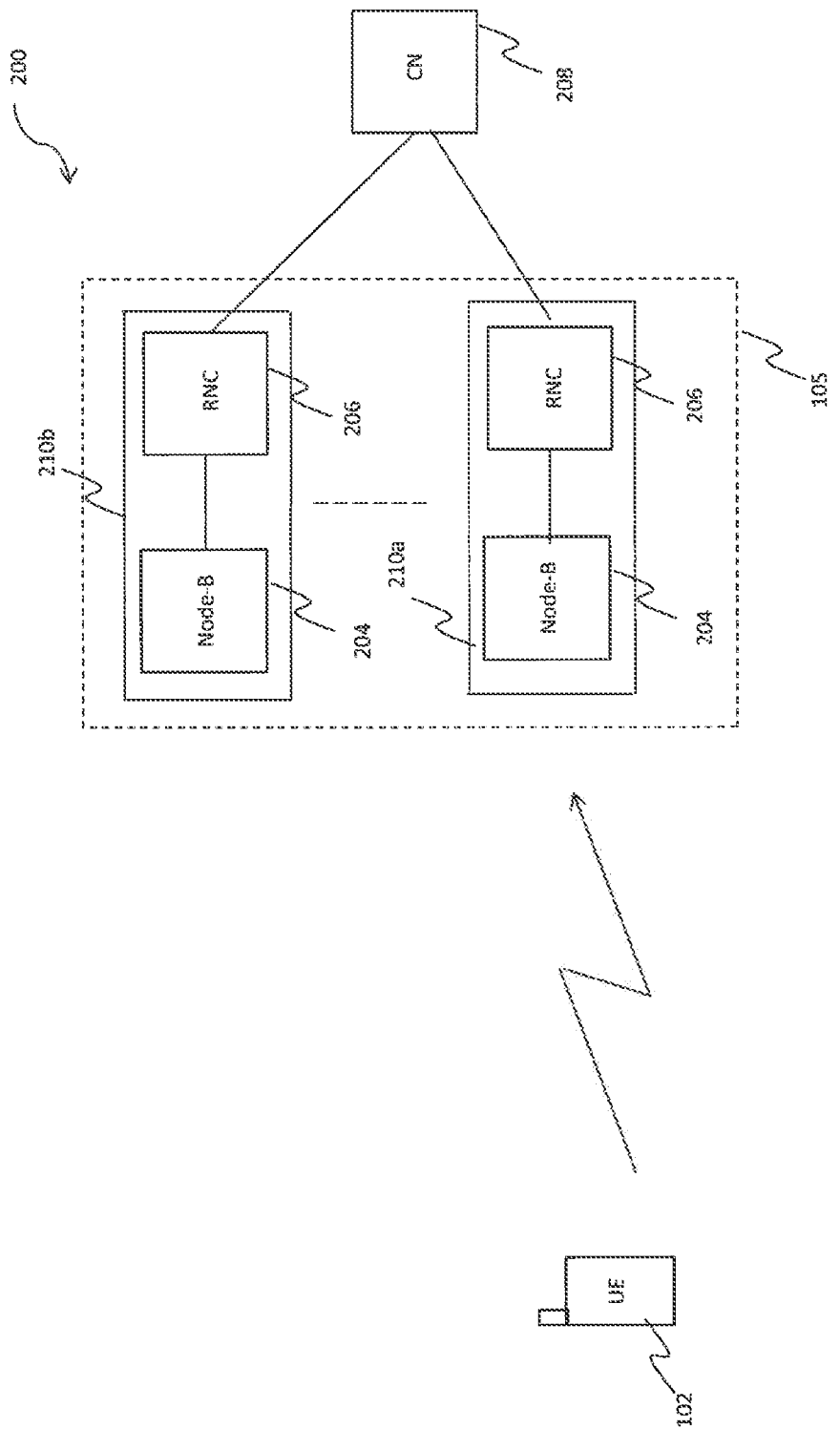
FIG. 2 shows a UMTS mobile communication system.

With reference to FIG. 2, there is illustrated the main elements of a Universal Mobile Telecommunications System (UMTS), generally denoted by reference numeral 200. It will be understood that in FIG. 2 only sufficient elements of the system are shown in order to present the context of the some arrangements of the present disclosure.

The UMTS communication system 200 comprises a wireless communications device termed user equipment (UE) 102. The user equipment 102 may be a mobile telephone, a personal digital assistant (PDA), a computer or any other device that exchanges data wirelessly. The UE 102 is in communication with a UMTS Terrestrial Radio Access Network (UTRAN) 105. The UTRAN 105 comprises one or more radio network sub-systems 210a, 210b. A radio network sub-system is a sub-network within the UTRAN 105 and comprises a base station 204 (termed node-B) and a radio network controller (RNC) 206. A node-B 204 is a transceiver which sends and receives wireless signals and defines a cell region. A RNC 206 is the network element responsible for the control of the radio resources of the UTRAN 105. A dedicated physical channel is established between the UE 102 and the node-B 204 to allow data communication to take place there between. It will be appreciated that a plurality of UEs and radio network sub-systems may be present in the UTRAN 105, which for clarity purposes are not shown. The UTRAN 105 is in communication with a core network 208. The structure of a UMTS mobile communication system as illustrated in FIG. 2 is well-known to one skilled in the art, and the further operation of such a system is not described herein.

Figure 3:
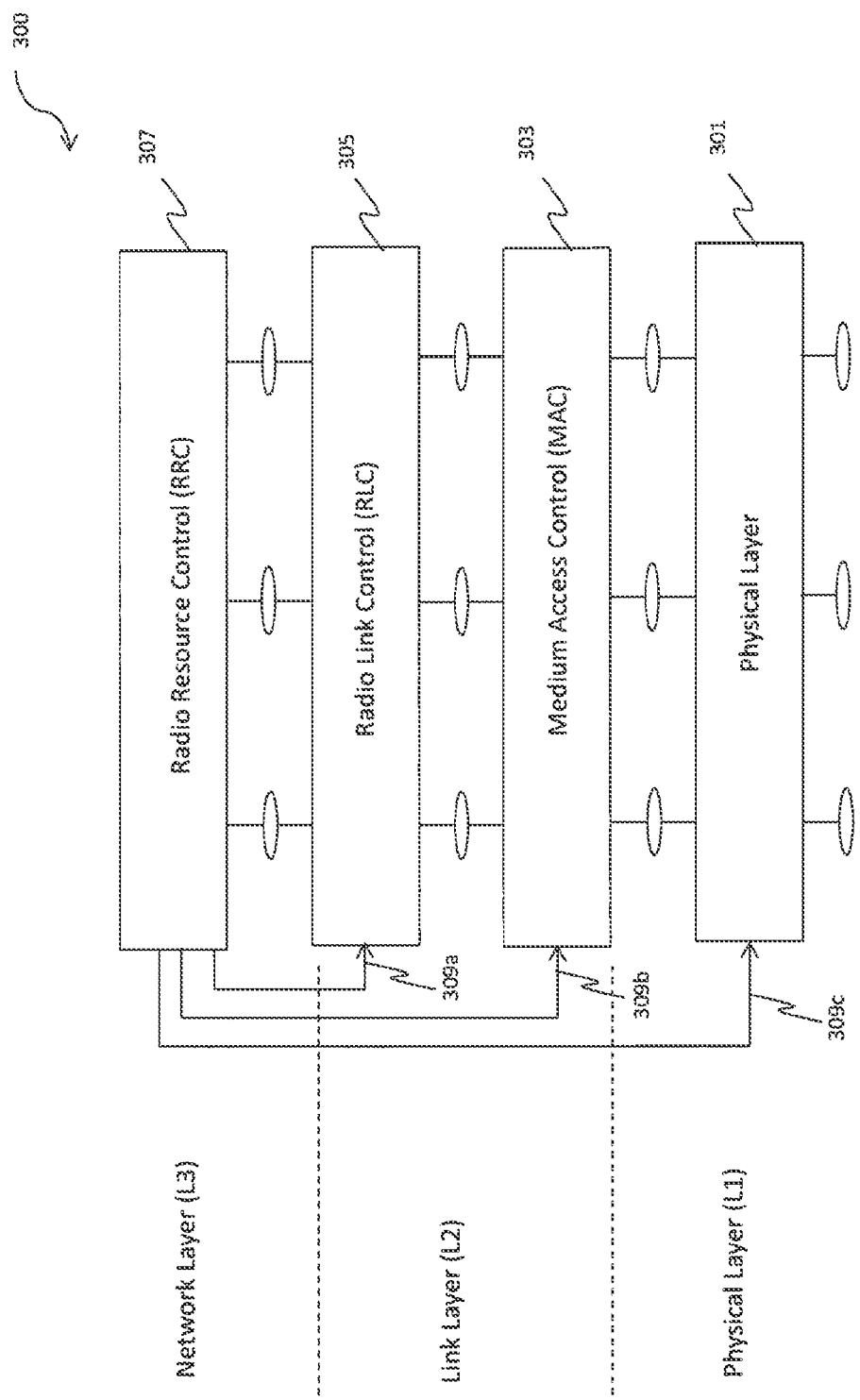
FIG. 3 shows a block diagram of a UMTS radio interface protocol architecture.

Referring to FIG. 3, there is shown a simplified block diagram of a UMTS radio interface protocol architecture 300. Communications between the UE 102 and the UTRAN 105 are effected in accordance with the multi-layered communications protocol shown in FIG. 3. The protocol architecture comprises a first layer (L1) which includes a physical layer 301, above the first layer is a second layer (L2) which includes a Medium Access Control (MAC) layer 303 and a Radio Link Control (RLC) layer 305, and above the second layer is a third layer (L3) which includes a Radio Resource Control (RRC) layer 307.

When data is transmitted from the UE 102 to the UTRAN 105, data passes from the UE to UTRAN in its corresponding layer. Within the UE, the data is passed down through the protocol layers before being transmitted via a physical channel in the physical layer. The data is passed from the RLC layer 305 to the MAC layer 303 using logical channels. The logical channel defines the type of information that is transferred. These logical channels include a common control channel (CCCH) and a dedicated control channel (DCCH). The CCCH is a bidirectional channel for transmitting control information between the UE 102 and the UTRAN 105. The DCCH is a bidirectional channel for transmitting control information between the UE 102 and the UTRAN 105, wherein the control information is dedicated to the particular UE. Other logical channels are well known to the persons skilled in the art and are not described herein. In the MAC layer 303 the logical channels are mapped to transport channels. In the physical layer 301 the transport channels are mapped onto physical channels. Thus with reference to FIG. 3, it can be seen that in order to accomplish a data transmission from the UE 102 to the UTRAN 105 data is passed down through the layer architecture 300 at the UE. Similarly, when data is received at the UE 102 from the UTRAN 105, data is passed up through the layer architecture 300 at the UE.

Control interfaces 309 between the RRC layer 307 and all the lower layer protocols are used by the RRC layer 307 to configure characteristics of the lower layer protocol entities, including parameters for the physical, transport and logical channels. The control interfaces 309 are used by the RRC layer 307 to command the lower layers to perform certain types of measurement and by the lower layers to report measurement results and errors to the RRC layer 307.

The RLC layer 305 provides services to higher layers for the transfer of user and/or control data. The service provided for user data is called Radio Bearer (RB) and the service provided for control data is called Signalling Radio Bearer (SRB). A SRB is associated with a signalling radio bearer queue and a logical channel. The RLC layer 305 may comprise multiple SRB's such that each SRB is associated with a signalling radio bearer queue and a logical channel.

Figure 1:
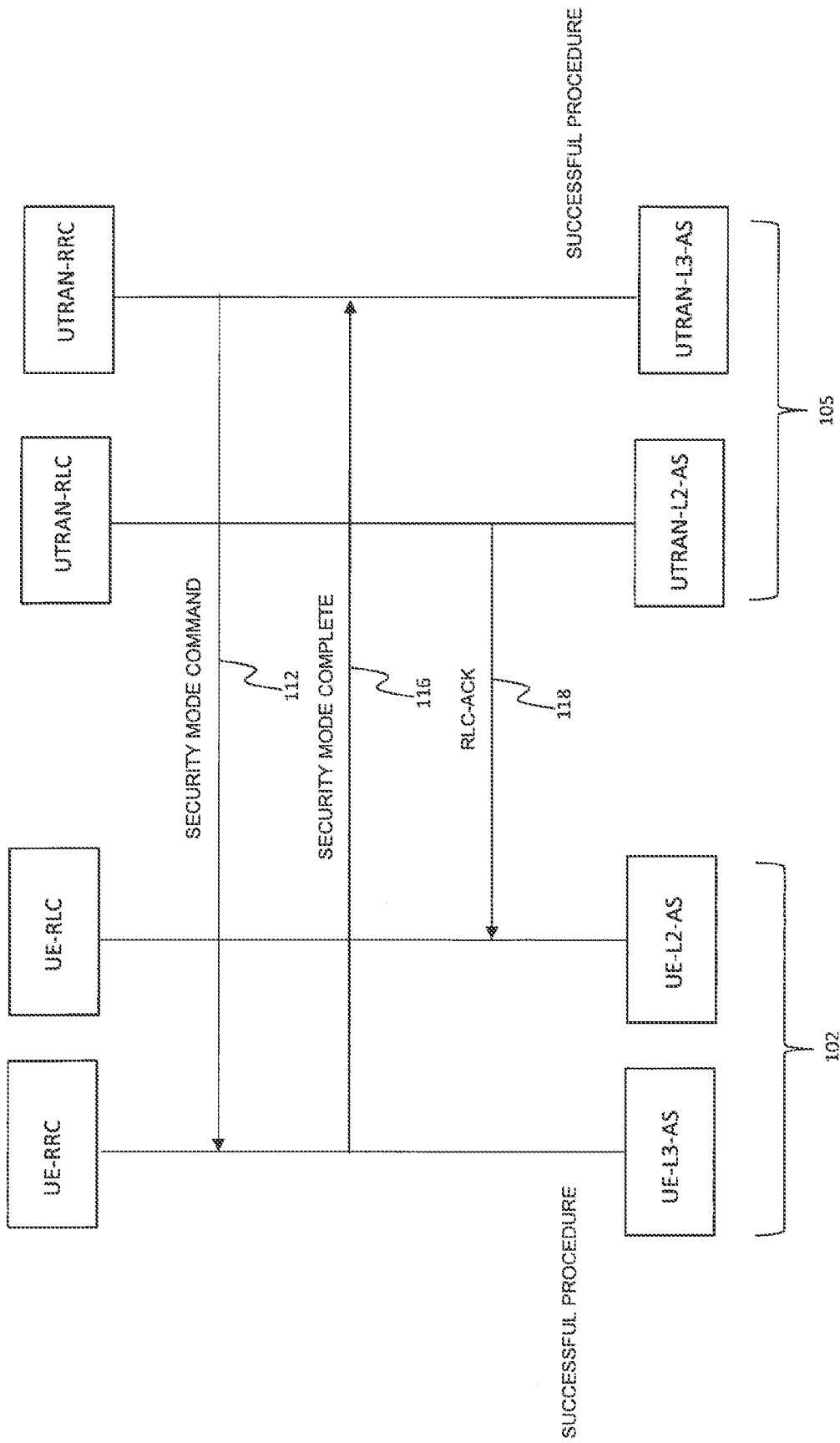
FIG. 1 shows a security procedure.

Referring to the Security Mode Command procedure shown in FIG. 1, after transmission of the acknowledgement 118 to the UE 102, the UTRAN 105 terminates the Security Mode Command procedure. After termination of the Security Mode Command procedure the UTRAN 105 will be arranged to use a particular integrity configuration and ciphering configuration for transmission and receipt of data to and from the UE 102.

Integrity protection is applied at the RRC layer 307 only. Only the signalling messages are integrity protected. The integrity protection is applied separately to each active SRB. The data radio bearers are not integrity protected. Ciphering is optional and is done for DCCH signalling as well as data radio bearers. For radio bearers using Acknowledged Mode (AM) or Unacknowledged Mode (UM) of operation, ciphering is done in the RLC layer 305 and is described in more detail with reference to FIG. 6. For radio bearers using Transparent Mode (TM) mode of operation, ciphering is done in the MAC layer 303. The ciphering process applies separately to each active radio bearer.

When a UE has established an RRC connection to the UTRAN, the UE is said to be in a "connected mode". If there is no established RRC connection, the UE is said to be in "idle mode". The connected mode can be further divided into different states which define what kind of physical channels the UE is using. An example of two of these different states are the CELL_FACH state and CELL_DCH state.

In the CELL_DCH state the UE is allocated a dedicated physical channel. In the CELL_FACH state there is no dedicated physical channel allocated to the UE. The UE communicates to the UTRAN using Random Access Channels (RACH) and Forward Access Channels (FACH) instead. It is in the CELL_FACH state that the UE can perform cell reselections and send Cell Update messages to the UTRAN.

A cell update procedure may be triggered during a Security Mode Command procedure shown in FIG. 1. The cell update procedure can cause the UE 102 and UTRAN 105 to use different integrity and ciphering configurations for the transmission and receipt of data. In particular, the 3GPP 25.331 specification mandates that the UTRAN aborts the Security Mode Command procedure when a cell update message is received before a Security Mode Command Complete message from the UE.

It is therefore possible for a transmission failure of a message between the UE and UTRAN (caused by, for example, poor radio conditions) to cause a failure in the Security Mode Command procedure at the UTRAN and not at the UE. The breakdown of the Security Mode Command procedure could lead to the loss of the RRC connection between the UTRAN and UE with the user of the UE being disconnected from the network until the connection is re-established.

Poor radio conditions are often manifest during a call set-up when the UE is in the CELL_FACH state. Moreover, the presence of poor radio conditions typically causes the UE to initiate a Cell Update procedure by transmitting a Cell Update message 608 to the UTRAN. An example of a UE device is a smart phone. Smart phones are typically configured to be able to operate in the CELL_FACH state due to the decreased power consumption compared to operating in the CELL_DCH state. As the number of smartphones operating within a communication network increases, so too will the number of UEs operating in the CELL_FACH state.

It would therefore be advantageous to detect the breakdown of a Security Mode Command procedure triggered by a Cell Update message.

Figure 4:
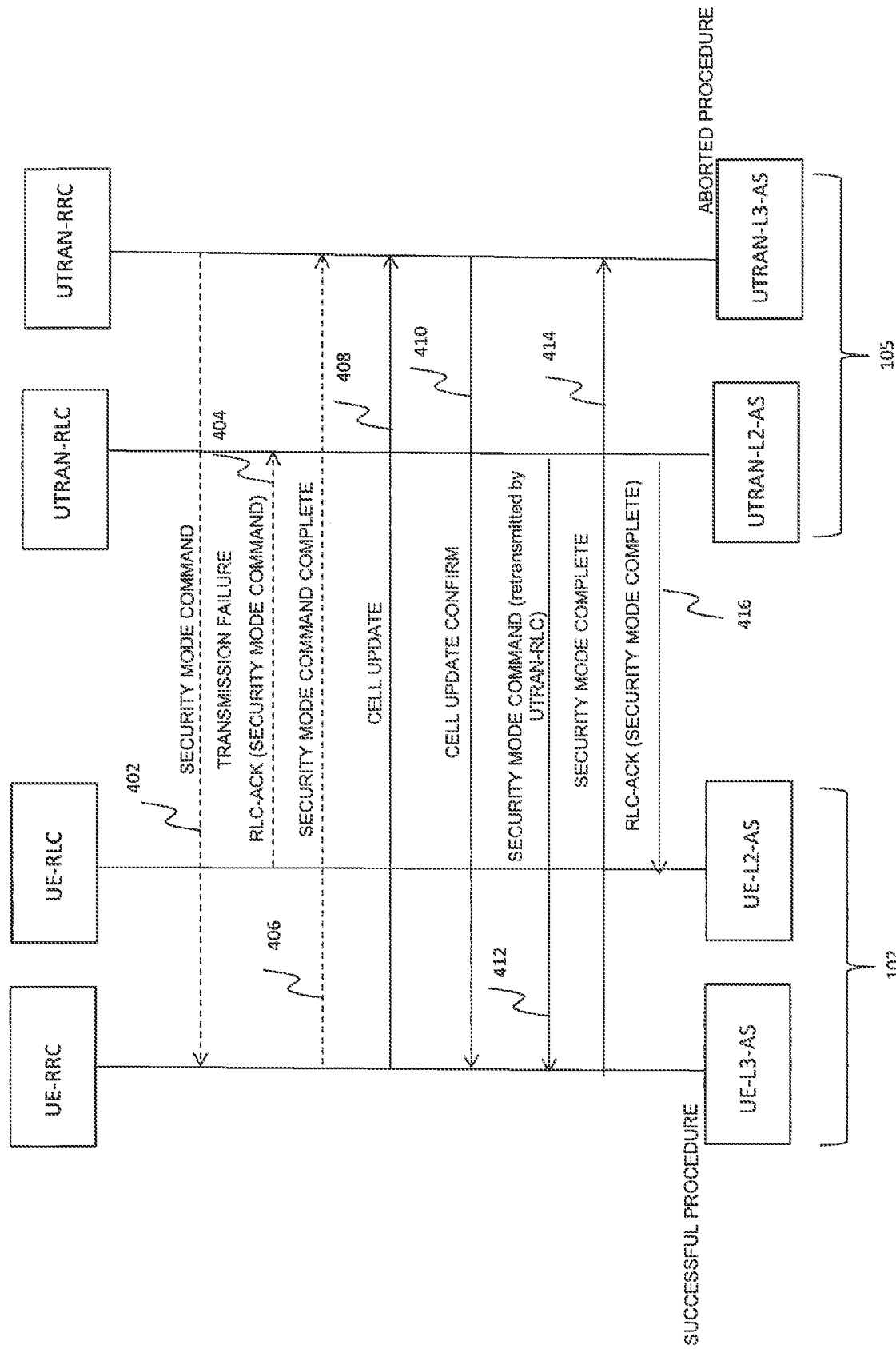
FIG. 4 shows a breakdown in a security procedure.

One embodiment for handling a breakdown of the Security Mode Command procedure that is not addressed by the 3GPP 25.331 specification is now described with reference to FIGS. 4 and 5.

As used herein, a Security Mode Configuration procedure is a procedure in which an original security mode configuration is replaced by a new security mode configuration. In the context of the 3GPP 25.331 specification, the Security Mode Configuration procedure is the Security Mode Command Procedure in which an original ciphering configuration and/or integrity protection configuration is replaced by a new ciphering configuration and/or integrity protection configuration. In particular, the 3GPP 25.331 specification describes that if the UTRAN receives a Cell Update message before it receives a Security Mode Command complete message, the UTRAN will abort Security Mode Configuration procedure being conducted.

At step 502 a cell update procedure is triggered at the UE and a Cell Update message 408 is transmitted to the UTRAN 105. At step 504 the UTRAN transmits a Cell Update Confirm message 410 back to the UE to complete the Cell Update procedure. A cell update procedure may be triggered for a number of reasons well known to a person skilled in the art, for example cell reselection if the UE is in the CELL_FACH state or radio link failure if the UE is in the CELL_DCH RRC state.

In certain circumstances, the triggering of the Cell Update procedure by the UE causes the UTRAN to abort a Security Mode Configuration procedure that is being conducted.

The transmission of the Cell Update message 408 will result in the UTRAN aborting a Security Mode Command procedure if a Security Mode Command message 402 previously transmitted as part of a Security Mode Command procedure underwent transmission failure. The Security Mode Command message contains an indication of the new security mode configuration (comprising the new ciphering and/or integrity configurations). The 3GPP 25.331 specification mandates that Security Mode Command messages are sent from the UTRAN on the downlink DCCH from the RLC in acknowledgement mode.

A transmission failure of the Security Mode Command message 402 (designated by the dashed arrow in FIG. 4) could be caused by, for example, poor radio conditions. It is worth noting that as a consequence of the transmission failure of the Security Mode Command message 402, an RLC-ACK (Security Mode Command) message 404 is not sent on the UL to the UTRAN.

The presence of poor radio conditions typically causes the UE to initiate a Cell Update procedure by transmitting a Cell Update message 408 to the UTRAN. The UTRAN completes the Cell Update procedure by transmitting a Cell Update Confirm message 410 back to the UE. The transmission failure of the DL Security Mode Command message 402 will mean that no UL Security Mode Command Complete message 406 will be transmitted to the UTRAN. Therefore the Cell Update procedure initiated by the UE causes the UTRAN to abort the Security Mode Command procedure, as mandated by the standard.

At step 506, the UE receives a Security Mode Command Message 412 indicating the new security mode configurations.

Although the RRC Security Mode Command procedure has been aborted at the UTRAN, the failure of the UTRAN RLC layer 305 to receive the RLC-ACK message 404 causes the Security Mode Command to be re-transmitted from the UTRAN RLC layer in a Security Mode Command re-transmit message 412 (because the Security Mode Command message is sent in acknowledgement mode). The RRC layer of the UE is unaware that the Security Mode Command message 412 is a re-transmitted message and so transmits a Security Mode Complete message 414 on the UL. In response the RLC layer of the UTRAN transmits an acknowledgement message RLC-ACK (Security Mode Complete) 416 to the UE, which completes the Security Mode Command procedure at the UE (step 508).

Although a Security Mode Complete message 414 is received at the UTRAN, the UTRAN does not complete the security mode command procedure as the procedure had previously been aborted at the RRC layer in response to the Cell Update message 408. Despite the procedure being aborted at the RRC layer of the UTRAN, the UTRAN re-transmits the new security mode configurations of the aborted procedure in Security Mode Command message 412 using the RLC protocol operating in acknowledgement mode. This leads to the completion of the Security Mode Command procedure at the UE and a failure of the procedure at the UTRAN, with the effect that the UE is now configured to use the new security mode configurations and the UTRAN has reverted back to the original security mode configurations. There is therefore a breakdown of the security mode command procedure caused by the resulting security mode mismatch.

The use of the term "original" here denotes the ciphering and/or integrity configuration that the UE 102 was arranged to use for handling data transmissions to and from the UTRAN 105 before the UE 102 received the Security Mode Command message from the UTRAN 105 with an indication of a new ciphering and/or integrity configuration to be used.

A security mode mismatch can lead to a loss of the RRC connection between the UE and UTRAN which results in the failure of a call. The re-establishment of a lost RRC connection is a slow process, and during the re-establishment process a user of a UE is unable to make or receive calls and is unable to connect to the radio access network. Depending on the radio conditions and network configurations, the recovery of a lost RRC connection can take up to one minute or more. It would therefore be beneficial to detect the security mode mismatch and to prevent the loss of the RRC connection.

Referring back now to FIG. 5, at step 510 a downlink message is received from the UTRAN 105. The downlink message is not part of a Security Mode Command procedure but can be any suitable downlink RRC message, for example a Common Control Channel (CCCH) or Dedicated Control Channel (DCCH) message. Once the downlink message is received at the UE, the UE will perform a security mode configuration check using a security mode configuration, as will be understood by a person skilled in the art (step 512). In this embodiment the security mode configuration comprises an integrity configuration.

Branch A relates to an alternative embodiment further described with reference to FIG. 7 in which the security mode configuration additionally comprises a ciphering configuration.

For a security mode configuration comprising integrity protection, the security mode configuration check comprises verifying the integrity of the received DL message using an integrity algorithm. The UE is configured to generate a Message Authentication Code (MAC) using an integrity algorithm that uses an integrity key (IK) as one input parameter. The integrity algorithm is performed at the L3 RRC layer 307 of the multi-layered communication protocol. The generated MAC is compared to the MAC received appended to the DL message. If the generated and received MACs match, the security mode configuration check is successful, whereas if the generated and received MACs do not match, the security mode configuration check fails. For a security mode configuration comprising integrity protection, replacing an original integrity protection configuration with a new integrity protection configuration as part of a security mode configuration procedure comprises replacing an original integrity key with a new integrity key.

A successful security mode configuration check is indicative that there is no security mode mismatch between the UE and UTRAN (i.e. the same integrity key is used at the UE and UTRAN), and the UE can continue to use the same integrity key in integrity checks performed on further received DL messages (step 516).

However, following the security mode mismatch as described in relation to the present embodiment, the UE will perform the security mode configuration check using the new integrity protection configuration whereas the DL message would have been transmitted from the UTRAN in accordance with the original integrity protection configuration and thus the security mode configuration check performed at the UE will fail. With a UE and UTRAN configured in accordance with the 3GPP 25.331 specification, this would lead to a loss of the RRC connection.

In accordance with the present embodiment, in the event that the security mode configuration check fails the UE is configured to perform a further security mode configuration check using the original integrity configuration (step 518).

The use of the term "original" here denotes the integrity configuration that the UE 102 was arranged to use for handling data transmissions to and from the UTRAN 105 before the UE 102 received the Security Mode Command message 412 from the UTRAN 105 with an indication of the new integrity configuration to be used.

If this further security mode configuration check succeeds, the UE can assume that the failure of the first security mode configuration check was due to the UTRAN aborting the Security Mode Command procedure. In this case, the UE can revert back to the original security mode configuration for use in performing further security mode configuration checks on further received downlink messages (step 522). This resolves the security mode mismatch between the UE and UTRAN and prevents the loss of the RRC connection.

Figure 6:
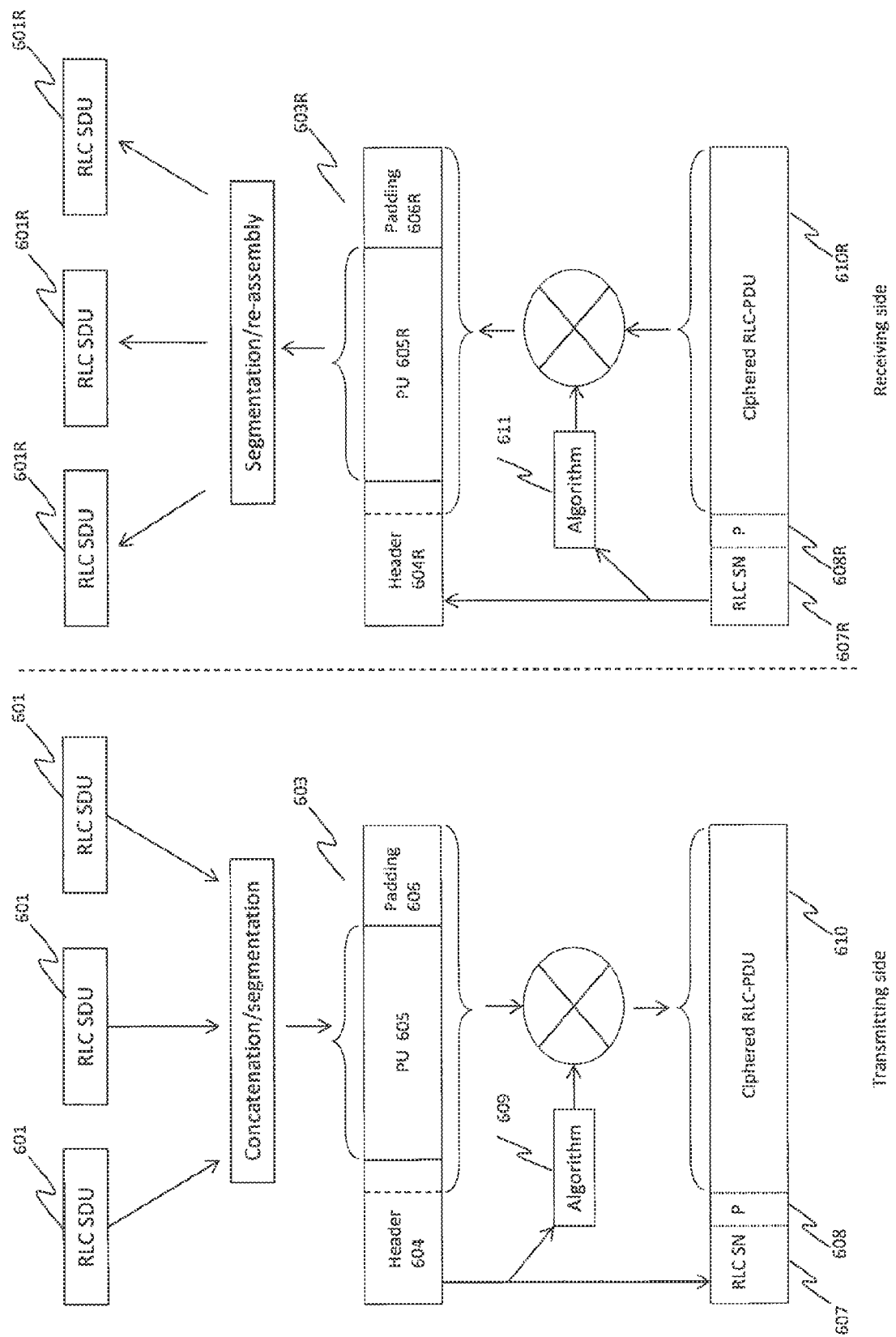
FIG. 6 is a schematic diagram illustrating ciphering and de-ciphering within an RLC layer.

FIG. 6 is a schematic diagram illustrating how data packets are passed through the RLC layer when ciphering is employed.

When data is to be transmitted, Standard Data Units (SDU) 601 are received in the RLC layer from the higher RRC layer. The SDU is the unit that is passed between interfaces of the layers of the multi-layered communication protocol. The RLC layer will then treat the SDU as a payload to which it adds a header to form an RLC-layer Protocol Data Unit (PDU).

The RLC PDU 603 will comprise a header 604 and a payload unit (PU) 605. The PU is of fixed length which can be determined by the RRC layer. Depending on the size of the PU, the PU may comprise either multiple concatenated SDUs (if the size of an SDU is less than the size of the PU) or a segmented portion of a single SDU (if the SDU is larger than the PU). Padding 606 may be appended to the PU to fill the PDU.

The header comprises an RLC PDU sequence number (SN) 607 and a poll-bit P 608. A sequence number is allocated to each PDU and is used at the receiver side to re-assemble the PUs of the PDU into SDUs to pass up to the RRC layer.

With the exception of the SN and poll bit P, the RLC PDU is then ciphered in accordance with a ciphering algorithm 609 to produce a ciphered-portion RLC-PDU 610, comprising the PU, padding and a segment of the header 603. The SN is used as an input to the ciphering algorithm and must be readable on the receiver-side in order to perform de-ciphering which is why it is not ciphered. The ciphering algorithm also has as an input a ciphering key (not shown).

On the receiver side, the ciphered portion 610R is de-ciphered using a de-ciphering algorithm 611 which has as an input the sequence number (SN) of the received RLC PDU 610R and a ciphering key (not shown). Once the de-ciphering is complete the header and padding can be extracted from the received PDU. If the RLC SDUs 601 were concatenated to form the payload unit 605 on the transmitting side, the deciphered payload unit 605R is segmented to extract the received SDUs 601R. If, on the other hand, the RLC SDU 601 was segmented into different payload units on the transmitting side, then once the PUs corresponding to that SDU are received at the receiver the SDU can be re-assembled. The received SDUs 601R are then passed up to the RRC layer on the receiving side.

An alternative embodiment for handling the breakdown of a Security Mode Configuration Procedure in which ciphering is employed is now described with reference to FIG. 7.

Figure 7:
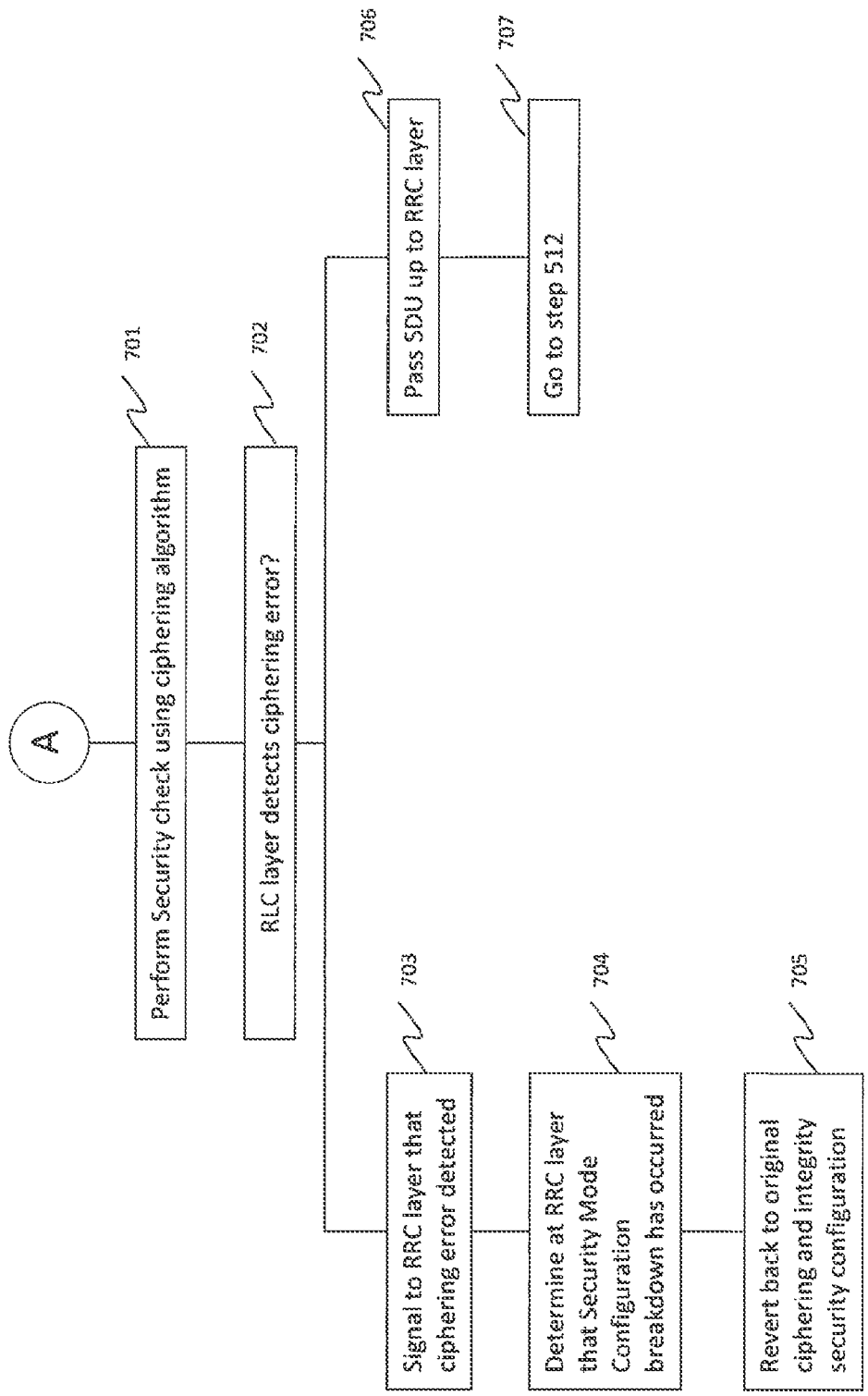
FIG. 7 is a flowchart of a process for detecting a breakdown in a security mode configuration procedure.

With reference to FIG. 7, at step 701 a ciphering check is performed on a received DL message by de-ciphering the received protocol data unit (PDU) in the RLC layer using a ciphering algorithm.

At step 702 it is determined in the RLC layer whether a ciphering error has occurred. For a security mode configuration comprising ciphering, replacing an original ciphering configuration with a new ciphering configuration as part of a security mode configuration procedure comprises replacing an original ciphering key with a new ciphering key.

The security mode mismatch results in the UE and UTRAN using different ciphering keys and hence different ciphering configurations. Despite this, it is not always possible for the RLC layer to detect that there has been a ciphering error. This is because the RLC layer does not perform any integrity checks on the payload data of the PDU and so can only detect a ciphering error in the event that the ciphered portion of the RLC header is affected. In certain circumstances the erroneously deciphered bits can still result in a valid RLC header.

In the event that the erroneously deciphered bits result in a valid RLC header, the RLC layer detects no ciphering error and the deciphered SDU is passed up to the RRC layer (step 706).

Figure 5:
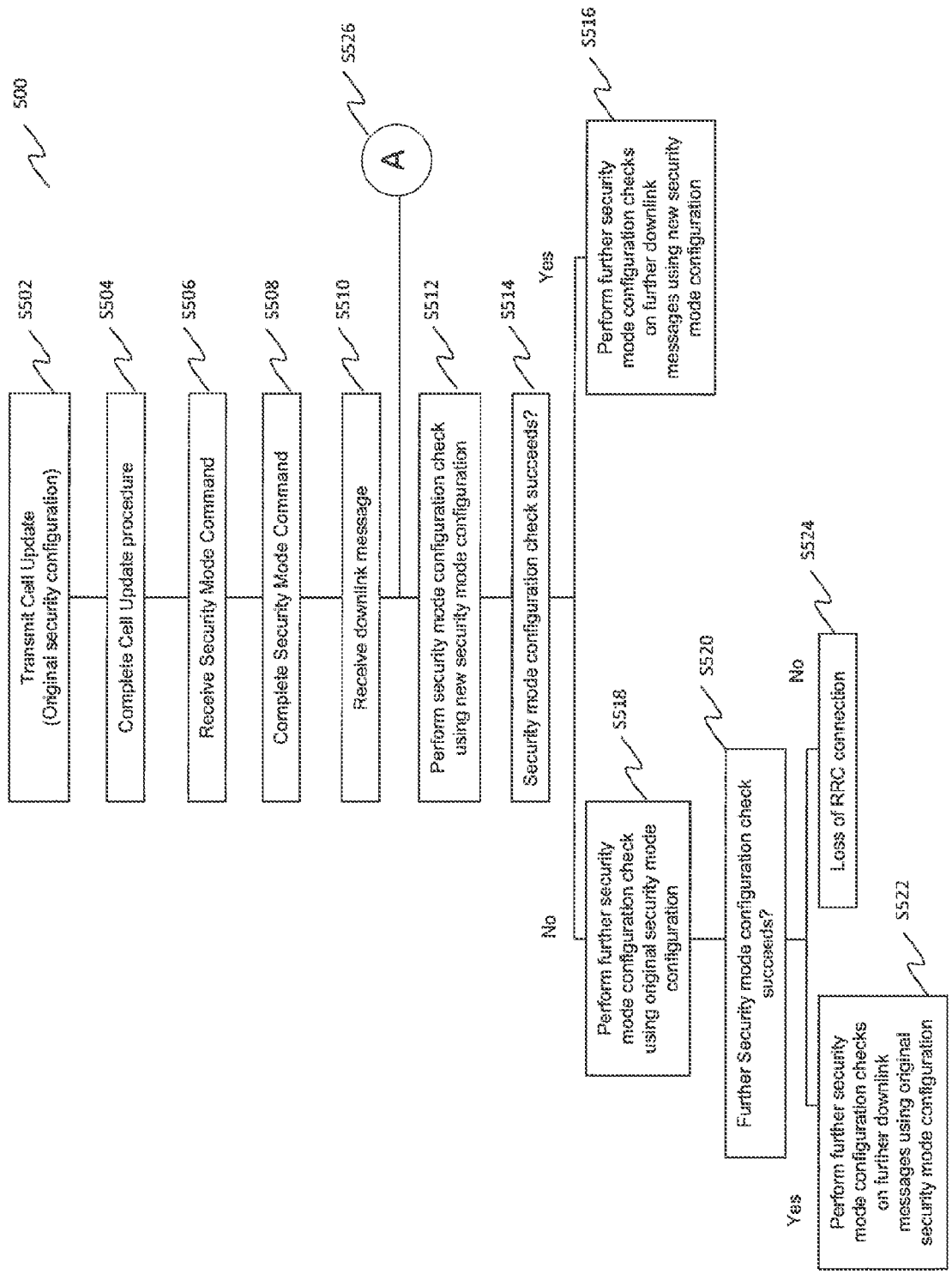
FIG. 5 is a flowchart of a process for detecting a breakdown in a security mode configuration procedure.

Once the SDU has been passed to the RRC layer the breakdown in the Security Mode Configuration procedure proceeds in accordance with step 512 of FIG. 5. That is, the RRC layer performs an integrity check on the received SDU using an integrity algorithm. Due to the security mode mismatch, this integrity check will fail because the MAC appended to the received SDU will have been generated using a different integrity key in the UTRAN than that being used at the UE to perform the integrity check.

When the RRC layer has detected that the security check has failed, it performs a further integrity check using the original integrity configuration (step 518). If this further check succeeds, the RRC layer determines that the failure of the first security mode configuration check was due to the UTRAN aborting the Security Mode Configuration procedure. The RRC layer then causes the UE to revert back to the original ciphering and integrity configurations.

Thus in this alternative embodiment if the RLC layer is unable to detect a ciphering error the SDU is passed to the RRC layer where the integrity check is used to detect the breakdown in the Security Mode Configuration procedure.

Referring back to step 702, if the RLC layer detects a ciphering error in the PDU header, the PDU is discarded within the RLC layer and no SDU is passed to the RRC layer. In this case, the RLC indicates to the RRC layer that a ciphering error has occurred (step 703). In response, the RRC layer checks the sequence number of the RLC-PDU which contained the ciphering error. If the SN corresponds to a part of the first SDU that is ciphered using the new ciphering configuration then the RRC determines that the security mode configuration procedure has broken down (step 704). In response to determining the breakdown, the RRC layer causes the UE to revert back to the original ciphering and integrity configurations. In other words, the RRC layer can determine that there has been a breakdown in the security mode configuration procedure based on the error indication received from the RLC layer resulting from a ciphering mismatch.

The use of the term "original" here denotes the integrity and ciphering configuration that the UE 102 was arranged to use for handling data transmissions to and from the UTRAN 105 before the UE 102 received the Security Mode Command message 412 from the UTRAN 105 with an indication of the new integrity and ciphering configuration to be used.

Figure 9:
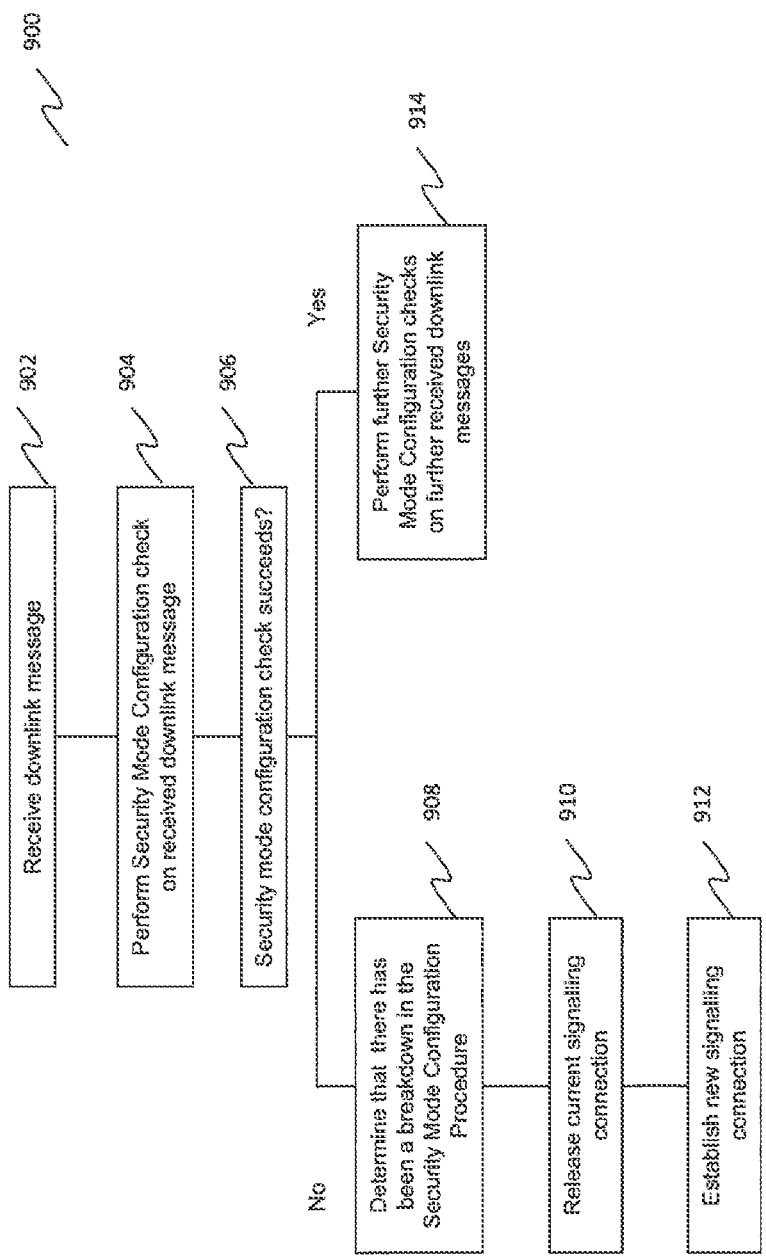
FIG. 9 is a flowchart of a process of an error recovery procedure in the event of a breakdown in a security procedure.

The embodiments just described with reference to FIGS. 4, 5, and 7 detail detecting a breakdown of a security mode command procedure which is not currently addressed by the 3GPP 25.331 specification in order to prevent the loss of an RRC connection between a UE and UTRAN. With reference to FIG. 9 there is described an alternative embodiment for an accelerated error recovery in the event of a breakdown in the security mode command procedure.

However, first there will follow a description of an alternative security mode command breakdown to that described with reference to FIG. 4.

Figure 8:
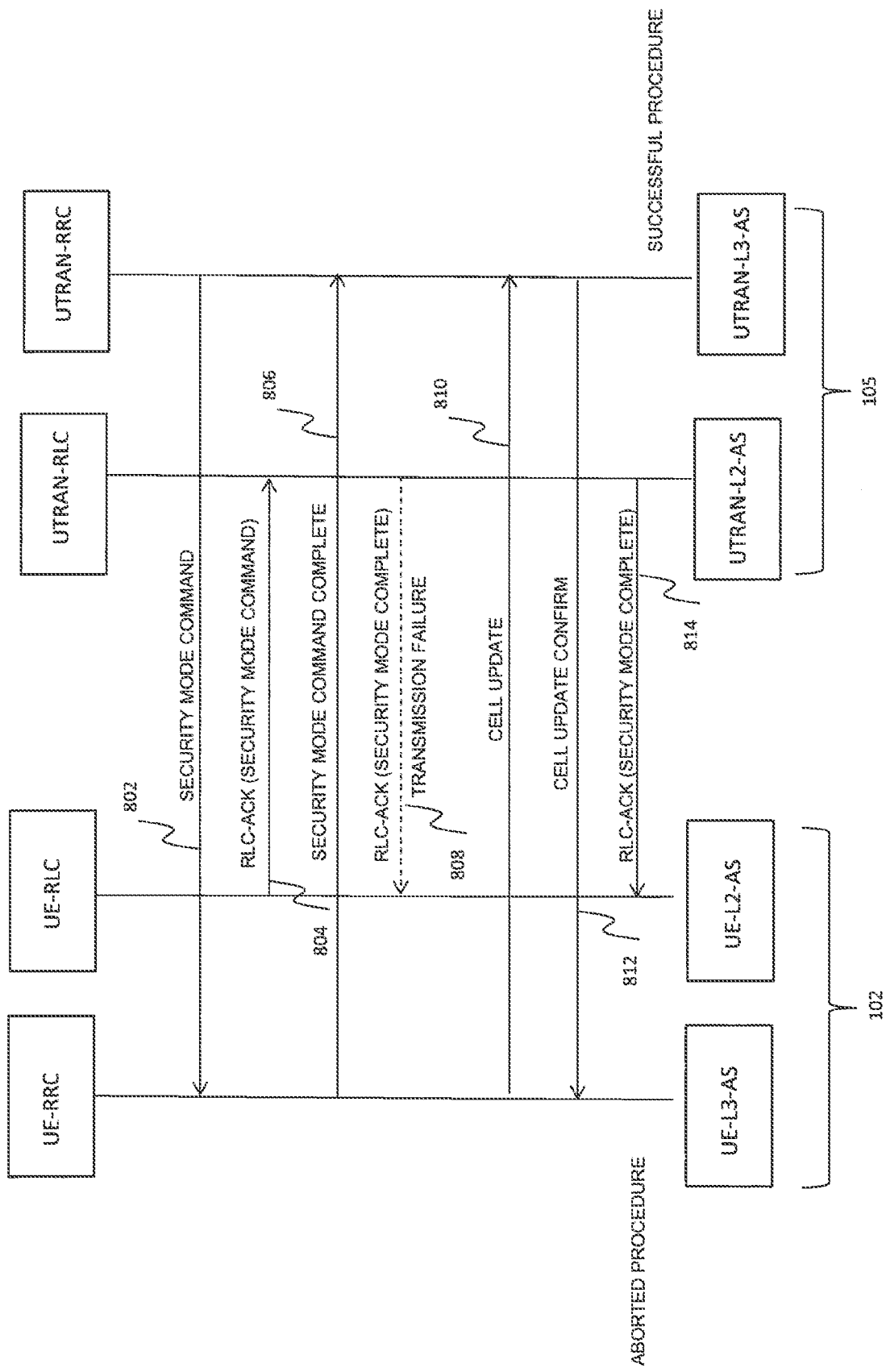
FIG. 8 shows a breakdown in a security procedure.

FIG. 8 illustrates a scenario in which the Security Mode Command procedure is completed at the UTRAN 105 but aborted at the UE 102.

As part of a Security Mode Command procedure the UTRAN transmits a Security Mode Command message 802 on the DL to the UE. On the UL the UE transmits an acknowledgement message 804 and subsequently sends an RRC Security Mode Command Complete message 806. The UTRAN completes the Security Mode Command procedure upon receipt of the Security Mode Command Complete message 806.

The UE does not complete the Security Mode Command procedure until it receives the acknowledgement message RLC-ACK (Security Mode Complete) 808 from the UTRAN. The acknowledgement messages 804 and 808 may be sent using the RLC protocol operating in Acknowledgement Mode (AM).

Poor radio conditions could lead to the transmission failure of the acknowledgment message 808. Similarly to the scenario described above, the poor radio conditions could lead to the UE to initiate a Cell Update procedure by transmitting a Cell Update message 810 to the UTRAN. In response the UTRAN sends back to the UE a Cell Update Confirm Message 812. A re-transmitted RLC-ACK (Security Mode Complete) message 814 is received on the DL, however this message does not complete the Security Mode Command procedure at the UE as the procedure had previously been aborted upon transmission of the Cell Update message 810.

The transmission of the Cell Update message from the UE before the receipt of the acknowledgement message 808 causes the UE to abort the Security Mode Command procedure. During a Security Mode Command procedure the RRC layer of the UTRAN cannot ascertain when the RLC-ACK message has been received by the UE and thus is not aware when the RRC Security Mode Command procedure has been completed at the UE.

In this example the triggering of the Cell Update message during the Security Mode Command procedure causes the UTRAN to complete the procedure and the UE to abort the procedure, with the effect that the UE will continue to employ the "original" integrity and ciphering configurations used prior to the initiation of the Security Mode Command procedure whilst the UTRAN will employ "new" integrity and ciphering configurations as determined by the Security Mode Command procedure.

Referring now to FIG. 9, at step 902 a downlink (DL) message is received at the UE 102. The downlink message is not part of a Security Mode Command procedure but can be any suitable downlink RRC message, for example a Common Control Channel (CCCH) or Dedicated Control Channel (DCCH) message. Once the downlink message is received at the UE, the UE will perform a security mode configuration check using a security mode configuration (step 904).

The security mode configuration could comprise either integrity protection or integrity protection and ciphering depending on whether the received DL message is both ciphered and integrity protected. The security mode configuration check comprises deciphering the received DL message in the RLC layer and/or performing an integrity check in the RRC layer, as described above.

If the security mode configuration check succeeds, the UE will continue to perform security mode configuration checks on further received downlink messages using the same integrity and ciphering configurations (step 914).

Alternatively, the security mode configuration check could fail. This could be because of a breakdown of the security mode command procedure as described with reference to either FIG. 4 or 8.

If the configuration check fails, the UE can determine that this was because of the breakdown of a security mode command procedure (step 908). For example if the breakdown was caused by the UE completing the security mode command procedure but the UTRAN aborting the procedure, then the UE can detect this breakdown as discussed above with respect to FIGS. 5 and 7.

In the embodiments described above, once the breakdown of the security mode command procedure has been detected, the RRC layer causes the UE to revert back to the original security mode configuration in order to prevent the loss of the RRC connection. In certain circumstances it may not be possible to revert back to the original security configuration once the breakdown of a security mode command procedure has been detected, for example if the breakdown is caused by the UE aborting the procedure but the UTRAN completing the procedure.

In these cases the breakdown in the security mode command procedure can lead to the loss of the RRC connection and subsequent attempts to re-establish it. This re-establishment process can be very slow. For example, a breakdown in the security mode command procedure can lead to a ciphering error in the RLC layer. This ciphering error can cause an RLC-Reset procedure to be initiated. An RLC reset procedure is used to reset the RLC peer entities within the UE and UTRAN. For an RLC configured to operate in Acknowledgement mode, the peer entities are the Acknowledgement mode entities.

During the Reset procedure, a RESET-PDU is sent from the UE to UTRAN. The RESET-PDU is not ciphered and so will be successfully received at the UTRAN. A RESET-ACK PDU is then sent from the UTRAN back to the UE to complete the RLC-Reset procedure. However, an RLC-Reset procedure does not reset all of the parameters that are input into the ciphering algorithm. Therefore there will still be a ciphering configuration mismatch between the UE and UTRAN as a result of the breakdown in the security mode command procedure. That is, a ciphering configuration mismatch is not fixed by the RLC-Reset procedure.

As a result of the continuing ciphering configuration mismatch, attempts to decipher a received DL message will lead to another ciphering error in the RLC layer that will lead to the triggering of a further RLC-Reset procedure. Each time the UE sends a RESET-PDU it increments a counter value VT(RST). The UE will continue to re-send the RESET-PDU for each triggered RLC-Reset procedure until the VT(RST) value is equal to a maximum value MaxRST. At this point the Reset procedure is terminated and an unrecoverable error is signalled to the RRC layer.

In response to receiving an indication of the unrecoverable error, the RRC layer initiates a Cell Update procedure. However, the Cell Update message transmitted by the UE will be discarded at the UTRAN due to the security configuration mismatch. As mandated by the 3GPP specification, a Cell Update message is retried N302 times (between 0 and 7) with a gap of T302 seconds (with 0.1 s<T302<8 s) between each re-try. After N302 tries, the RRC layer resets the UE into Idle mode.

Therefore a breakdown in security mode command procedure can lead to the initiation of a re-establishment process that can take up to around a minute or more. During this time the user is disconnected from the network, unable to make a call.

According to the present embodiment, once the UE has determined that there has been a security mode configuration breakdown, the RRC layer 307 can immediately release the existing RRC signalling connection to the UTRAN and begin establishment of a new RRC signalling connection (steps 910 and 912). This avoids the initiation of the RLC Reset procedure which can leave the user disconnected from the network for long periods of time.

That is, in situations following the breakdown of a security mode configuration procedure, the error recovery can be accelerated by releasing the existing RRC connection and establishing a new RRC connection compared to attempting to perform an RLC-Reset procedure. Thus the present embodiment can reduce the time the user is disconnected from the UTRAN due to a security configuration mismatch and avoid the user being disconnected for up to a minute or more.

The RRC layer of the UE could be configured to, upon releasing existing RRC connection, automatically begin establishment of a new RRC connection to re-establish the lost call. This may allow the lost call to be retried automatically without requiring input from the user of the UE, in accordance with the 3GPP 24.008 specification.

Figure 10:
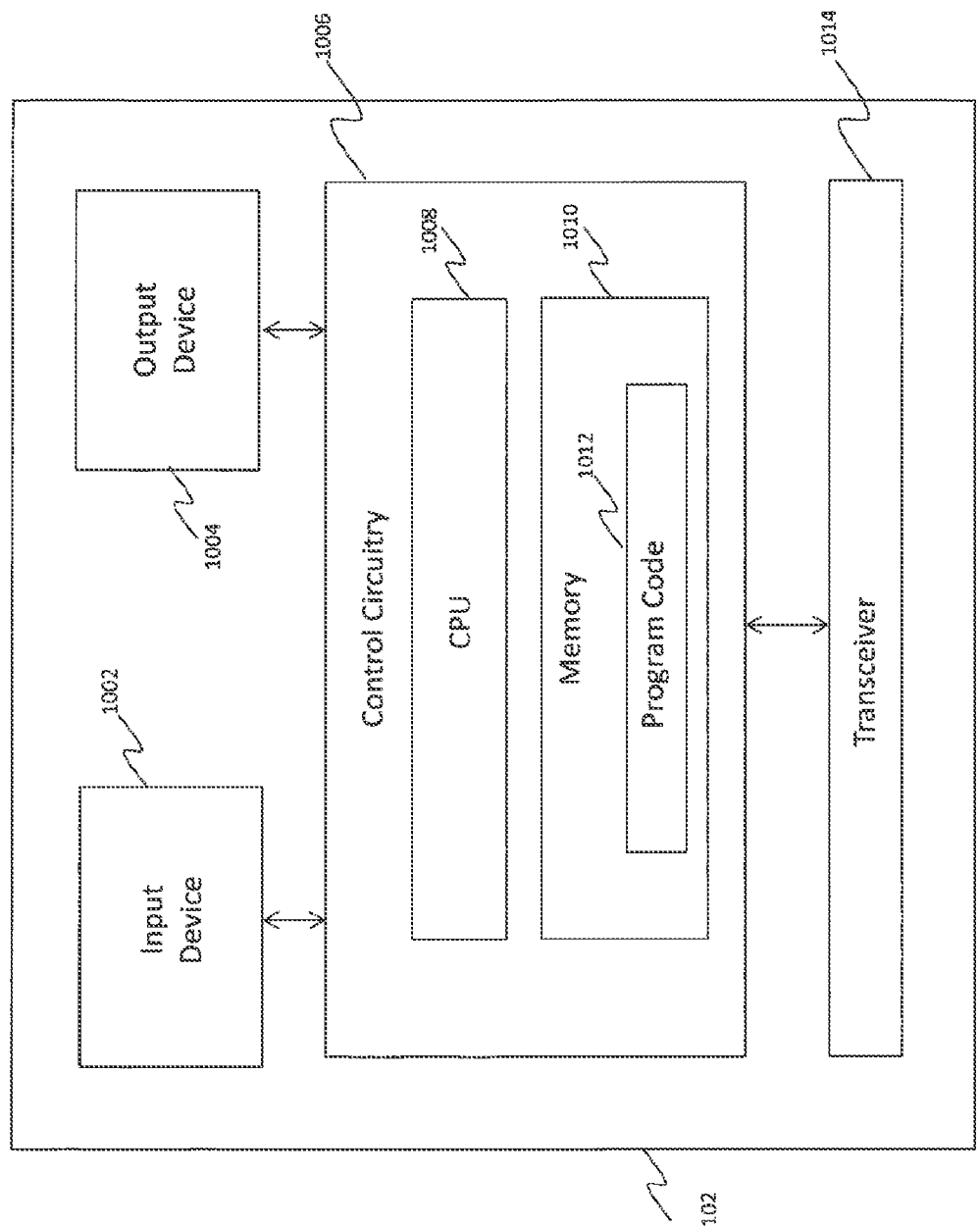
FIG. 10 is a block diagram of a user equipment.

FIG. 10 is a functional block diagram of a UE 102 according to the present disclosure. For simplicity, FIG. 10 only shows an input device 1002, an output device 1004, a control circuit 1006, a central processing unit (CPU) 1008, a memory 1010, program code 1012, and a transceiver 1014 of the UE 102. The UE 102 can receive signals input by a user of the UE 102 through the input device 1002, such as a keyboard, and can output images and sounds through the output device 1004, such as a display or speakers. The transceiver 1014 is used to receive and transmit wireless signals, deliver received signals to the control circuit 1006, and output signals generated by the control circuit 1006 wirelessly. In the UE 102, the control circuit 1006 executes the program code 1012 stored in the memory 1010 through the CPU 1008, thereby controlling an operation of the UE 102. The features of the techniques described below are platform-independent, meaning that the techniques may be implemented on a variety of commercial computing platforms having a variety of processors. The program code 1012 can be stored in one or more computer readable memory devices. The memory 1010 may be volatile memory such as RAM or non-volatile memory such as flash (EEPROM). The memory 1010 may be a component of the UE's circuitry or may be on non-transitory machine-readable media, examples of which are well known in the art. Referring back to the UMTS radio interface protocol architecture 200 shown in FIG. 2, the transceiver 1014 can be seen as a portion of Layer 1, and the control circuit 206 can be utilised to realise functions of Layer 2 and Layer 3.

The CPU 1008 executes the program code 1012 so as to implement the present disclosure. The steps of one embodiment are detailed above with references to FIGS. 4, 5, and 7. The steps of a further embodiment are detailed above and illustrated in FIG. 9.

In the present disclosure, the step of performing a further security mode configuration check may comprise using the original security mode configuration.

The step of performing a further security mode configuration check may comprise checking that the received downlink message is a first downlink message checked using the new security mode configuration.

The new security mode configuration could comprise a new integrity configuration; and the original security mode configuration could comprise an original integrity configuration.

The new security mode configuration further could comprise a new ciphering configuration; and the original security mode configuration further could comprise an original ciphering configuration.

The step of performing a security mode configuration check on the received downlink message using the new security mode configuration may comprise performing an integrity check on the received downlink message using the new integrity configuration; and the step of performing a further security mode configuration check on the downlink message may comprise performing an integrity check on the received downlink message using the original integrity configuration.

The wireless communication device may communicate with the radio access network in accordance with a multi-layered communication protocol and the integrity check may be performed at a Radio-Resource Control (RRC) layer of the multi-layered protocol.

The step of performing a security mode configuration check on the received downlink message using the new security mode configuration may comprise de-ciphering the received downlink message using the new ciphering configuration; and the step of performing a further security mode configuration check may comprise checking that the received downlink message is a first downlink message de-ciphered using the new ciphering configuration. The further security mode configuration check may succeed if the received downlink message is the first downlink message de-ciphered using the new ciphering configuration.

The received downlink message may comprise a sequence number and the sequence number may be used to check that the received downlink message is the first downlink message deciphered using the new ciphering configuration.

The wireless communication device may communicate with the radio access network in accordance with a multi-layered communication protocol and the security mode configuration check may be performed at a Radio Link Control (RLC) layer of the multi-layered communication protocol and the further security mode configuration check may be performed at a Radio Resource Control (RRC) layer of the multi-layered communication protocol.

The cell-update message may be transmitted from the wireless communication device in accordance with the original security mode configuration.

The new security mode configuration could be received from the radio access network in the form of a security mode command message and the security mode configuration procedure could be implemented according to the Radio Resource Control (RRC) security mode configuration procedure.

The security mode configuration procedure could correspond to the Security Mode Command Procedure defined in the 3GPP 25.331 specification.

In the present disclosure the new security mode configuration may comprise a new ciphering configuration; and the original security mode configuration may comprise an original ciphering configuration, and performing the security mode configuration check may comprise deciphering the received downlink message using the new ciphering configuration. The step of determining that there has been an error in a security mode configuration procedure may comprise checking that the received downlink message is a first downlink message de-ciphered using the new ciphering configuration.

The security mode configuration check may be performed using the original security mode configuration.

The RLC reset procedure could be used to reset an RLC entity at the wireless communication device.

Embodiments have been described herein in relation to 3GPP specifications. The method and apparatus described herein are not intended to be limited to the specifications or versions thereof referred to herein but may be applicable to future versions or other specifications.

While the present disclosure has been particularly shown and described with reference to some embodiments, it will be understood to those skilled in the art that various changes in form and detail may be made without departing from the scope of the invention as defined by the appendant claims.

The invention claimed is:

1. A method of detecting, at a wireless communication device, an error in a security mode configuration procedure conducted at a radio access network in wireless communication with the wireless communication device, the method comprising:

transmitting from the wireless communication device a cell update message to the radio access network, the cell update message transmitted to cause the radio access network to abort a security mode configuration procedure which is to replace an original security mode configuration with a new security mode configuration;

receiving at the wireless communication device, after the transmission of said update message, the new security mode configuration and completing a security mode configuration procedure at the wireless communication device to replace the original security mode configuration with the new security mode configuration; and thereafter receiving at the wireless communication device a downlink message from the radio access network;

performing a security mode configuration check on the received downlink message using said new security mode configuration;

in the event that the security mode configuration check fails, performing a further security mode configuration check on the downlink message to detect an error in the security mode configuration procedure, wherein the step of performing a further security mode configuration check comprises the wireless communication device using said original security mode configuration or checking that the received downlink message is a first downlink message checked using said new security mode configuration; and when the further security mode configuration check detects an error in the security mode configuration procedure, performing security mode configuration checks on further downlink messages received from the network using the original security mode configuration thereby resolving any security code mismatch between the wireless communication device and the radio access network and preventing any loss of the wireless communication.

2. The method as claimed in claim 1, wherein the new security mode configuration comprises a new integrity configuration; and the original security mode configuration comprises an original integrity configuration.

3. The method as claimed in claim 2, wherein the new security mode configuration further comprises a new ciphering configuration; and the original security mode configuration further comprises an original ciphering configuration.

4. The method as claimed in claim 2, wherein the step of performing a security mode configuration check on the received downlink message using said new security mode configuration comprises performing an integrity check on the received downlink message using the new integrity configuration; and the step of performing a further security mode configuration check on the downlink message comprises performing an integrity check on the received downlink message using the original integrity configuration.

5. The A method as claimed in claim 2, wherein the wireless communication device communicates with the radio access network in accordance with a multi-layered communication protocol and the integrity check is performed at a Radio-Resource Control (RRC) layer of the multi-layered protocol.

6. The method as claimed in claim 3, wherein the step of performing a security mode configuration check on the received downlink message using said new security mode configuration comprises de-ciphering the received downlink message using the new ciphering configuration; and the step of performing a further security mode configuration check comprises checking that the received downlink message is a first downlink message de-ciphered using the new ciphering configuration.

7. The method as claimed in claim 6, wherein the further security mode configuration check succeeds if the received downlink message is the first downlink message de-ciphered using the new ciphering configuration.

8. The method as claimed in claim 6, wherein the received downlink message comprises a sequence number, the sequence number being used to check that the received downlink message is the first downlink message deciphered using the new ciphering configuration.

9. The method as claimed in claim 3, wherein the wireless communication device communicates with the radio access network in accordance with a multi-layered communication protocol and said security mode configuration check is performed at a Radio Link Control (RLC) layer of the multi-layered communication protocol and the further security mode configuration check is performed at a Radio Resource Control (RRC) layer of the multi-layered communication protocol.

10. The method as claimed in claim 1, wherein the cell-update message is transmitted from the wireless communication device in accordance with the original security mode configuration.

11. The method as claimed in claim 1, wherein the new security mode configuration is received from the radio access network in the form of a security mode command message and wherein the security mode configuration procedure is implemented according to the Radio Resource Control (RRC) security mode configuration procedure.

12. The method as claimed in claim 1, wherein the security mode configuration procedure corresponds to the Security Mode Command Procedure defined in the Third Generation Partnership Project (3GPP) 25.331 specification.

13. A wireless communications device arranged to detect an error in a security mode configuration procedure conducted at a radio access network in wireless communication with the wireless communication device, the wireless communication device comprising:

a transceiver arranged to transmit from the wireless communication device a cell update message to the radio access network, the cell update message transmitted to cause the radio access network to abort a security mode configuration procedure which is to replace an original security mode configuration with a new security mode configuration;

a central processing unit; and a memory coupled to the central processing unit, the memory containing program code executable by the central processing unit causing the central processing unit to perform the following steps:

receive, after the transmission of said update message, the new security mode configuration and completing a security mode configuration procedure at the wireless communication device to replace the original security mode configuration with the new security mode configuration; and thereafter receive a downlink message from the radio access network;

perform a security mode configuration check on the received downlink message using said new security mode configuration;

in the event that the security mode configuration check fails, perform a further security mode configuration check on the downlink message to detect an error in the security mode configuration procedure, wherein the step of performing a further security mode configuration check comprises the wireless communication device using said original security mode configuration or checking that the received downlink message is a first downlink message checked using said new security mode configuration; and when the further security mode configuration check detects an error in the security mode configuration procedure, perform security mode configuration checks on further downlink messages from the network using the original security mode configuration thereby resolving any security code mismatch between the wireless communication device and the radio access network and preventing any loss of the wireless communication.

14. A computer program product for detecting, at a wireless communication device, an error in a security mode configuration procedure conducted at a radio access network in wireless communication with the wireless communication device, the computer program product comprising code embodied on a non-transient computer-readable medium and configured so as when executed on a processing apparatus of the wireless communication device to perform the steps of the central processor of claim 13.

15. A method of performing, at a wireless communication device, an error recovery in the event of detecting an error in a security mode configuration procedure conducted at a radio access network in wireless communication with the wireless communication device in accordance with a multi-layered communication protocol, the method comprising:

receiving, at the wireless communication device, a downlink message from the wireless communication network effected by a signaling connection at a Radio Resource Control (RRC) layer of the multi-layered communication protocol between the wireless communication device and the wireless communication network;

performing a security mode configuration check on the received downlink message;

in the event that the security mode configuration check fails, determining that there has been an error in a security mode configuration procedure for replacing an original security mode configuration with a new security mode configuration, wherein the step of determining whether there has been an error in a security mode configuration procedure comprises the wireless communication device using said original security mode configuration or checking that the received downlink message is a first downlink message checked using said new security mode configuration;

in response to that determination, releasing at the wireless communication device the signaling connection at the RRC layer to the wireless communication network without initiating a Radio Link Control (RLC) reset procedure; and beginning establishment of a new signaling connection at the RRC layer to the wireless communication network thereby resolving any security code mismatch between the wireless communication device and the radio access network and preventing any loss of the RRC connection.

16. The method as claimed in claim 15, wherein the new security mode configuration comprises a new ciphering configuration; and the original security mode configuration comprises an original ciphering configuration, wherein performing the security mode configuration check comprises deciphering the received downlink message using the new ciphering configuration; and the step of determining that there has been an error in a security mode configuration procedure comprises checking that the received downlink message is a first downlink message de-ciphered using the new ciphering configuration.

17. The method as claimed in claim 15, wherein the RLC reset procedure is used to reset an RLC entity at the wireless communication device.

\* \* \* \* \*